(12) United States Patent
Luten et al.

(10) Patent No.: US 10,486,601 B2
(45) Date of Patent: Nov. 26, 2019

(54) POLARIZED ELECTRO-OPTIC ELEMENT

(71) Applicant: Gentex Corporation, Zeeland, MI (US)

(72) Inventors: Henry A. Luten, Holland, MI (US); William L. Tonar, Holland, MI (US); Leroy J. Kloeppner, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 137 days.

(21) Appl. No.: 15/584,260

(22) Filed: May 2, 2017

(65) Prior Publication Data
US 2017/0320441 A1    Nov. 9, 2017

Related U.S. Application Data

(60) Provisional application No. 62/331,214, filed on May 3, 2016.

(51) Int. Cl.
*B60R 1/12* (2006.01)
*B60R 1/04* (2006.01)
(Continued)

(52) U.S. Cl.
CPC .................. *B60R 1/12* (2013.01); *B60R 1/04* (2013.01); *B60R 1/08* (2013.01); *B60R 1/088* (2013.01);
(Continued)

(58) Field of Classification Search
CPC ...... G02B 5/30; G02B 5/3033; G02B 5/3041; G02B 27/286; G02B 5/3083;
(Continued)

(56) References Cited

U.S. PATENT DOCUMENTS

| | | |
|---|---|---|
| 2002/0154379 A1 | 10/2002 | Tonar et al. |
| 2006/0007550 A1 | 1/2006 | Tonar et al. |

(Continued)

FOREIGN PATENT DOCUMENTS

EP    2008869 A1    12/2008

OTHER PUBLICATIONS

International Search Report and Written Opinion of the International Searching Authority, or the Declaration, dated Aug. 31, 2017, for International Application No. PCT/US 2017/030588 filed May 2, 2017; 9 pages.

*Primary Examiner* — Jennifer D. Carruth
(74) *Attorney, Agent, or Firm* — Price Heneveld LLP; Bradley D. Johnson

(57) ABSTRACT

A vehicular rearview assembly is provided that includes a display configured to emit light of a first polarization. A reflective polarizer is positioned adjacent the display. The reflective polarizer is configured to transmit the light of the first polarization and reflect light of a second polarization and an electro-optic element is positioned on an opposite side of the reflective polarizer than the display. The electro-optic element is configured to transition between substantially clear and substantially darkened states. The electro-optic element includes a plurality of electrochromic molecules substantially aligned with the second polarization of the light such that the electro-optic element is configured to substantially absorb the light of the second polarization when in the darkened state.

20 Claims, 6 Drawing Sheets

(51) Int. Cl.
  *B60R 1/08* (2006.01)
  *G02F 1/01* (2006.01)
  *G02F 1/13* (2006.01)
  *G02F 1/1506* (2019.01)
  *G02F 1/157* (2006.01)
  *G02F 1/1335* (2006.01)
  *G02F 1/1347* (2006.01)

(52) U.S. Cl.
  CPC .......... *G02F 1/0136* (2013.01); *G02F 1/1313* (2013.01); *G02F 1/1347* (2013.01); *G02F 1/133536* (2013.01); *G02F 1/1506* (2013.01); *G02F 1/157* (2013.01); *B60R 2001/1215* (2013.01); *G02F 2201/44* (2013.01); *G02F 2203/07* (2013.01)

(58) Field of Classification Search
  CPC ........ G02B 27/281; G02B 5/305; G02C 7/12; G02F 1/133502; G02F 1/01; G02F 1/13; G02F 1/15; G02F 1/157; G02F 1/1506; G02F 1/1313; G02F 1/0136; B60R 1/12; B60R 1/04; B60R 1/08; B60R 1/088
  See application file for complete search history.

(56) References Cited

U.S. PATENT DOCUMENTS

| | | |
|---|---|---|
| 2009/0096937 A1 | 4/2009 | Bauer et al. |
| 2009/0201137 A1 | 8/2009 | Weller et al. |
| 2010/0277786 A1* | 11/2010 | Anderson .............. B60R 1/088 359/247 |
| 2014/0340723 A1 | 11/2014 | Matsubara et al. |
| 2014/0340728 A1 | 11/2014 | Taheri |
| 2015/0036085 A1 | 2/2015 | Chen et al. |
| 2015/0076390 A1* | 3/2015 | Kloeppner ............. G02F 1/153 252/62.2 |

\* cited by examiner

POLARIZED ELECTRO-OPTIC ELEMENT

CROSS-REFERENCE TO RELATED APPLICATION

This application claims the benefit of and priority to U.S. Provisional Patent Application No. 62/331,214, filed on May 3, 2016, entitled POLARIZED ELECTRO-OPTIC ELEMENT, the entire disclosure of which is hereby incorporated herein by reference.

FIELD

The present disclosure generally relates to an electro-optic element, and more particularly, a rearview mirror system having a polarized electro-optic element.

SUMMARY OF THE DISCLOSURE

According to one aspect of the present disclosure, a vehicular rearview assembly is provided that includes a display configured to emit light of a first polarization. A reflective polarizer is positioned adjacent the display. The reflective polarizer is configured to transmit the light of the first polarization and reflect light of a second polarization and an electro-optic element is positioned on an opposite side of the reflective polarizer than the display. The electro-optic element is configured to transition between substantially clear and substantially darkened states. The electro-optic element includes a plurality of electrochromic molecules substantially aligned with the second polarization of the light such that the electro-optic element is configured to substantially absorb the light of the second polarization when in the darkened state.

According to another aspect of the present disclosure, a vehicular rearview assembly is provided that includes a display configured to emit light of a first polarization. A reflective polarizer is positioned adjacent the display. The reflective polarizer is configured to transmit the light of a first polarization and reflect light of a second polarization. An electro-optic element includes a first substantially transparent substrate defining first and second surfaces. The second surface includes a first electrically conductive layer. A second substantially transparent substrate defines third and fourth surfaces. The third surface includes a second electrically conductive layer. A primary seal is disposed between the first and second substrates. The seal and the first and second substrates define a cavity there between and a polymeric film is disposed within the cavity and includes a plurality of electrochromics aligned with the light of the second polarization, the polymeric film being variably transmissive to the light of the second polarization such that the electro-optic element is operable between substantially clear and darkened states relative to the light of the second polarization.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1:
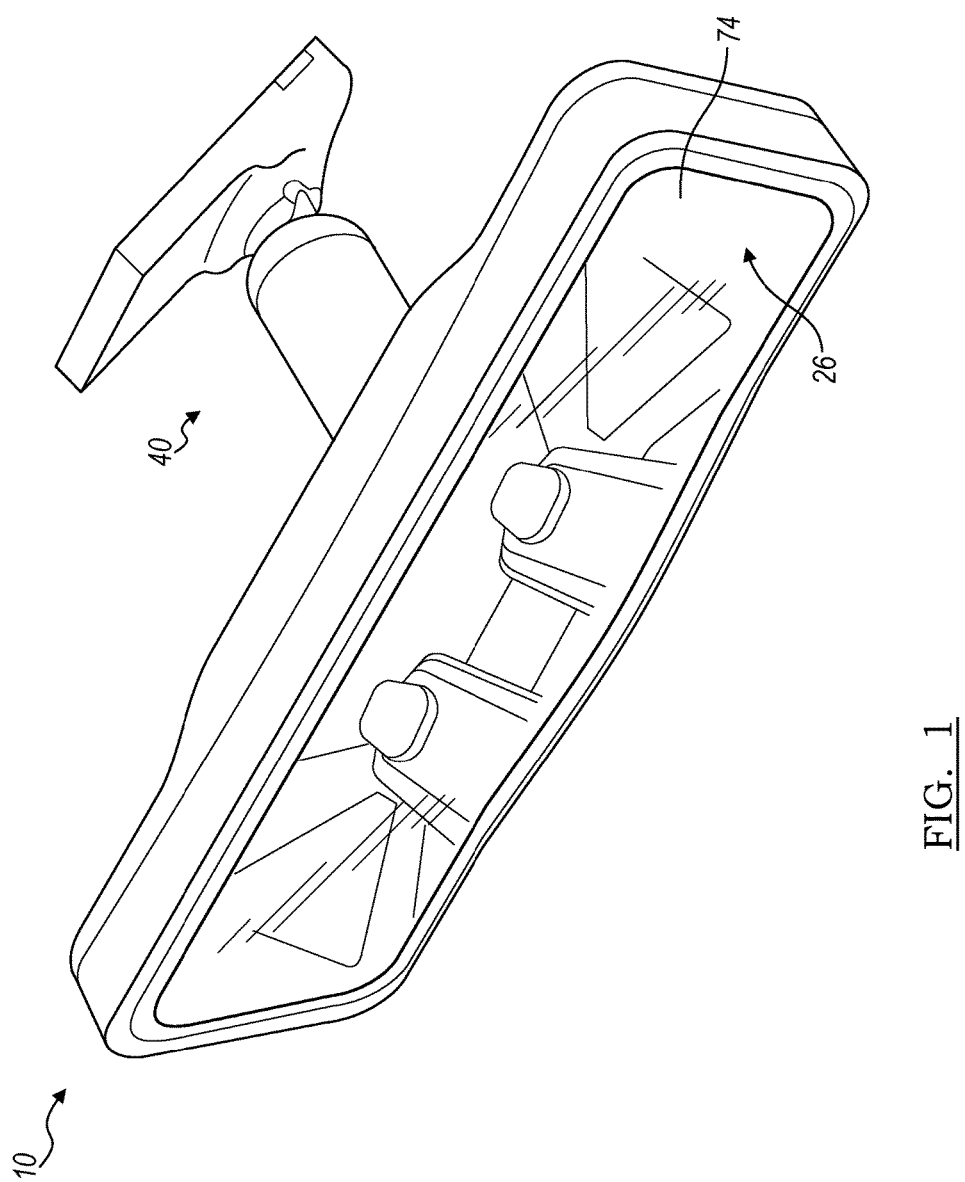
FIG. 1 is a top perspective view of a rearview mirror assembly, according to one example.

The present illustrated embodiments reside primarily in combinations of method steps and apparatus components related to an electro-optic element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1-5B, reference numeral 10 generally designates a vehicular rearview assembly. The rearview mirror assembly 10 includes a display 14 which is configured to emit light 18 having a first polarization P1. A reflective polarizer 22 is positioned adjacent the display 14. The reflective polarizer 22 is configured to transmit the light 18 having the first polarization P1 and reflect the light 18 having a second polarization P2. An electro-optic element 26 is positioned on an opposite side of the reflective polarizer 22 than the display 14. The electro-optic element 26 is configured to transition between substantially clear and substantially darkened states. The electro-optic element 26 includes a plurality of electrochromics substantially aligned with the second polarization P2 of the light 18 such that the electro-optic element 26 is configured to absorb the light 18 having the second polarization P2 when in the substantially darkened state.

Figure 2:
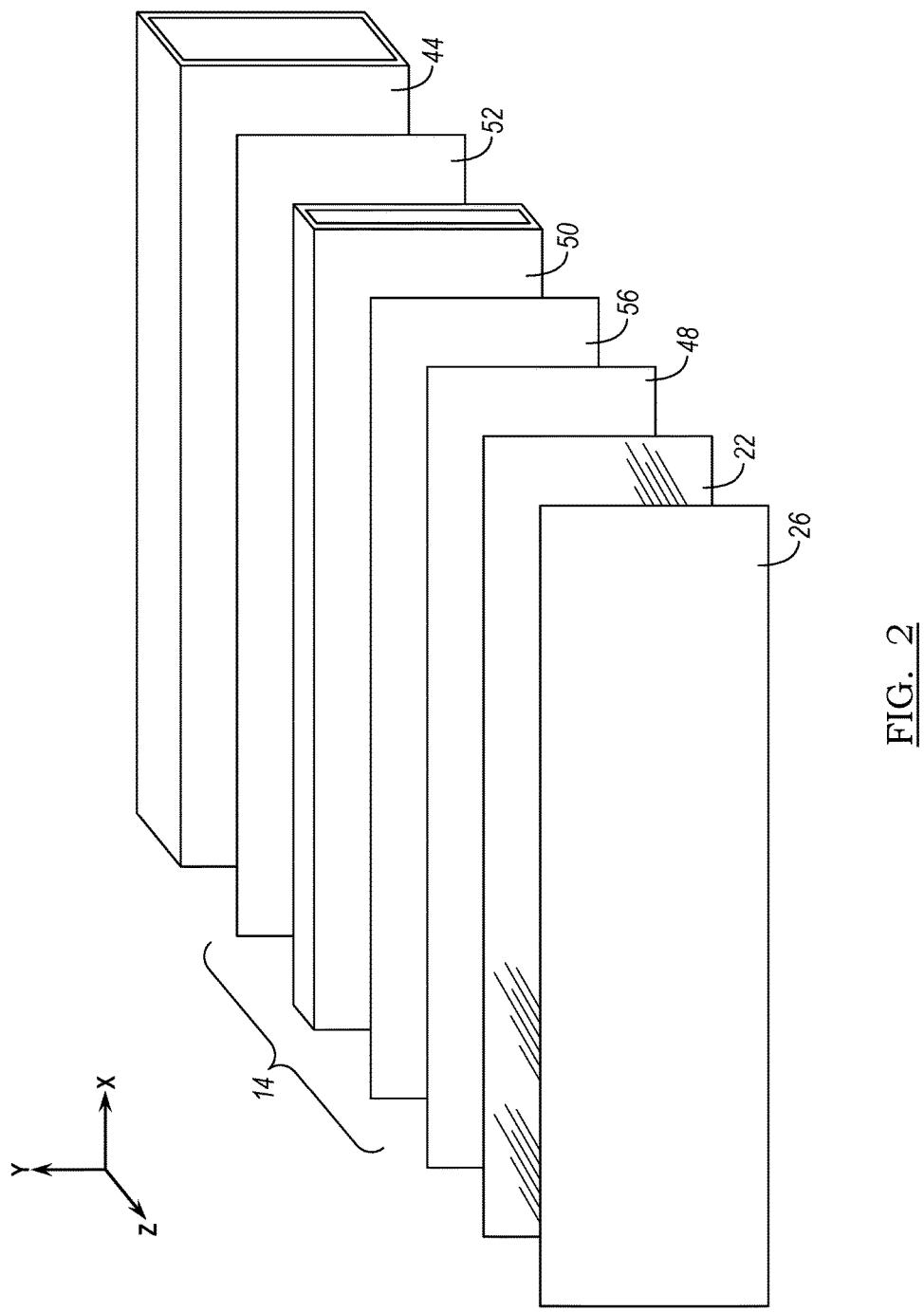
FIG. 2 is a partial exploded view of the rearview mirror assembly of FIG. 1, according to one example.

Referring now to FIGS. 1 and 2, the illustrated rearview mirror assembly 10 can be an interior rearview assembly positioned within an interior of a vehicle. When the rearview mirror assembly 10 is an interior rearview assembly, the rearview mirror assembly 10 may be connected to a mount 40, which is adapted to be mounted inside the vehicle in a location proximate to or on a front windshield of the vehicle. It should be noted that the present disclosure is equally applicable to exterior mirrors, as well as other optical assemblies positioned within bezels and housings. The mirror assembly 10 includes, in order from a rear position (e.g., vehicle forward) to a front position (e.g., vehicle rearward), a light source 44, the display 14, an optional substrate 48, the reflective polarizer 22 and the electro-optic element 26. It will be understood that the reflective polarizer 22 may be positioned on either a vehicle-forward or vehicle-rearward surface of the optional substrate 48 without departing from the teachings provided herein. The light source 44, or light engine, is configured to backlight the display 14 by providing light to a rear of the display 14. The light 18 (FIGS. 5A and 5B) may be polarized or unpolarized. Light 18 from the light source 44 moves in a Z-direction through the rearview mirror assembly 10, through the display 14, and toward the electro-optic element 26. In the depicted example, the display 14 is a liquid crystal display incorporating a liquid crystal medium 50 disposed between two polarizers, an entrance polarizer 52 and an exit polarizer 56. The light source 44 and or display 14 may extend the entire length of the rearview mirror assembly 10 creating a "full-display" assembly, or may only extend a portion of the length. It will be appreciated, however, that a concept of a "full-display" assembly, where the display 14, or a plurality of displays, located behind the electro-optic element 26, overlaps in projection onto a viewable surface of assembly 10, with most or all of this viewable surface, is also contemplated by the various examples of this disclosure. The display 14 and/or light source 44 may be angled (e.g., about 3° to about 5°) relative to the reflective polarizer 22 and optionally include an optical bonding adhesive disposed between display 14, the reflective polarizer 22, the optional substrate 48 and other locations.

The entrance and/or exit polarizers 52, 56 may include a reflective polarizer which may be a linear polarizer, an elliptical polarizer or a circular polarizer and might include an optical retarder such as a quarter-wave plate or a half-wave plate. A wire-grid polarizer provides one example of a reflective polarizer that may be used for the entrance and/or exit polarizers 52, 56. Alternatively, a reflective polarizer may include a polymer-based film structure including at least one optically anisotropic layer. Such polymer-based film structure is generally referred to herein as an anisotropic polymer-based film (APBF). Non-limiting examples of APBFs are provided by a multilayered polymer film, including a body of alternating layers of a crystalline-based polymer and another selected polymer, or by micro-structured film-based polarizers, such as brightness enhancement films, or by dual brightness enhancement films.

Figure 5A:
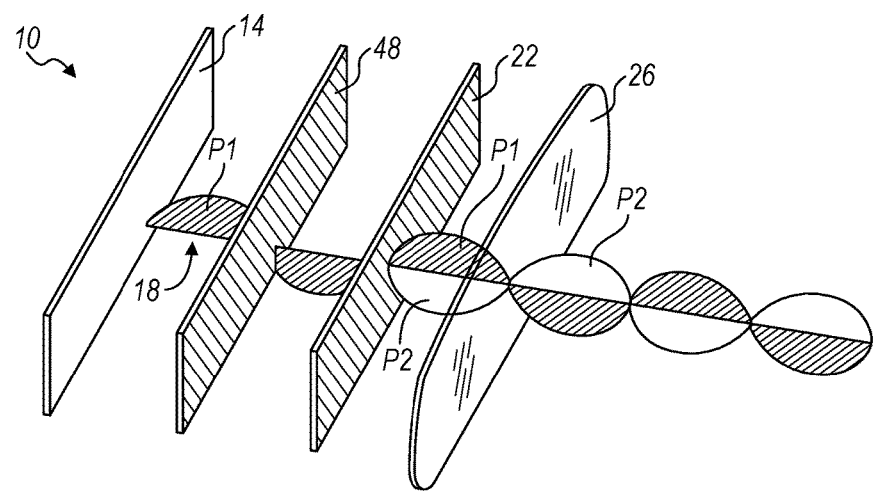
FIG. 5A depicts light interacting with a reflective polarizer and the electro-optic element in a substantially clear state, according to one example.
Figure 5B:
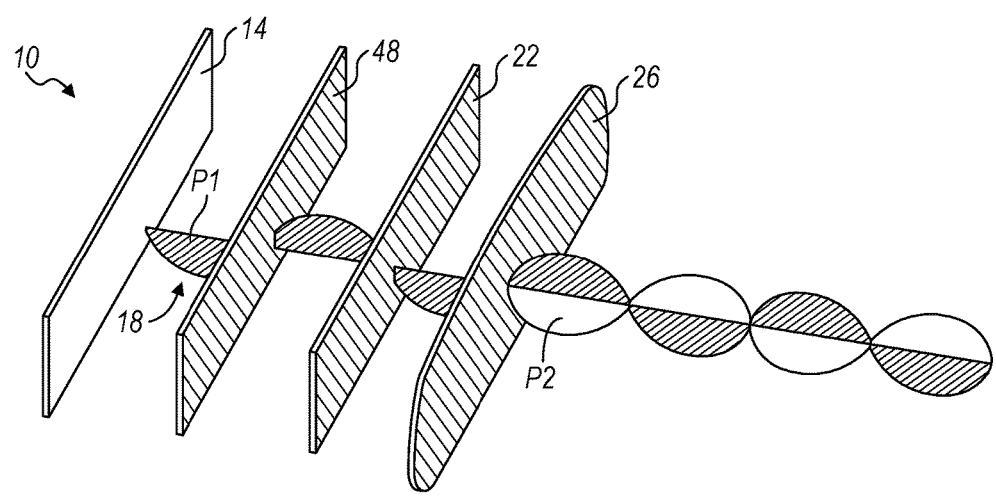
FIG. 5B depicts light interacting with a reflective polarizer and the electro-optic element in a substantially darkened state, according to one example.

Positioned vehicle rearward of the display 14 is the optional substrate 48 and the reflective polarizer 22. The optional substrate 48 may be a piece of glass, polymer or other sufficiently optical clear component configured to transmit light from the display 14. The reflective polarizer 22 may be positioned on the substrate 48 (e.g., on a vehicle forward or vehicle rearward surface). In a specific example, the reflective polarizer 22 may be laminated onto a surface of the substrate 48. The reflective polarizer 22 substantially transmits light having one type of polarization (e.g., the first polarization P1, as seen in FIGS. 5A and 5B) while substantially reflecting light of another polarization (e.g., the second polarization P2, as seen in FIG. 5A). This may produce an effect of making the rearview mirror assembly 10 essentially transparent to the light 18 (FIGS. 5A and 5B) having the first polarization P1 generated by the display 14 and/or light source 44, while maintaining a useful level of overall reflectance of unpolarized ambient light having the second polarization P2 (FIG. 5A) incident upon the rearview mirror assembly 10. Similar to the entrance and/or exit polarizers 52, 56, the reflective polarizer 22 may be a linear polarizer, an elliptical polarizer or a circular polarizer and might include an optical retarder such as a quarter-wave plate or a half-wave plate. As explained above, wire-grid polarizer provides one example of the reflective polarizer 22. Alternatively, the reflective polarizer 22 may include a polymer-based film structure comprising at least one ABPF.

Optimization of light transmission from the light engine or light source 44 through the display 14 towards the electro-optic element 26 may be achieved by orienting the reflective polarizer 22 so as to have its transmission axis be collinear, or parallel, with the transmission axis of the exit polarizer 56 of the display 14 (i.e., to allow the light 18 having the first polarization P1 (FIG. 5A)). Alternatively, the reflective polarizer 22 may also be used as a replacement for the exit polarizer 56 of the display 14. In this "maximum transmission" orientation, the reflective polarizer 22 transmits approximately 88.5% of the light 18 having the first polarization P1 emanating from the display 14 and reflects about 50% of the unpolarized ambient light 18 including the second polarization P2 incident upon the reflective polarizer 22 through the electro-optic element 26 back to a viewer of the rearview mirror assembly 10.

Figure 3A:
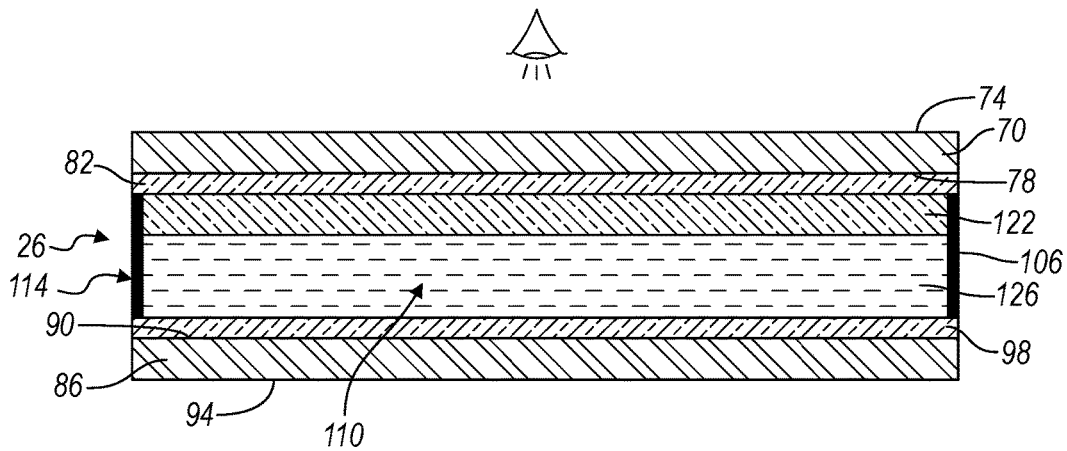
FIG. 3A is a cross-sectional view of an electro-optic element, according to one example.
Figure 3B:
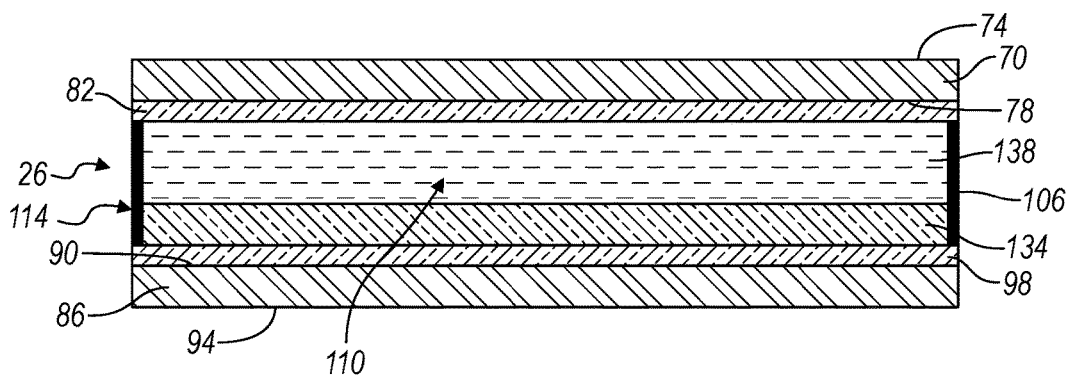
FIG. 3B is a cross-sectional view of an electro-optic element, according to another example.
Figure 3C:
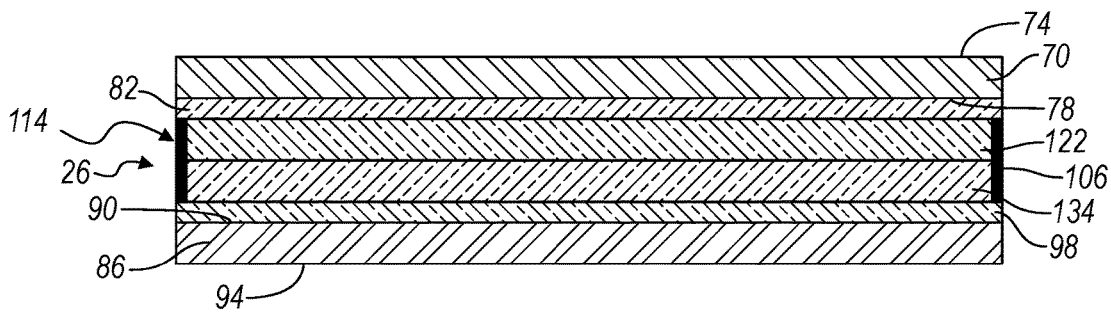
FIG. 3C is a cross-sectional view of an electro-optic element, according to another example.
Figure 3D:
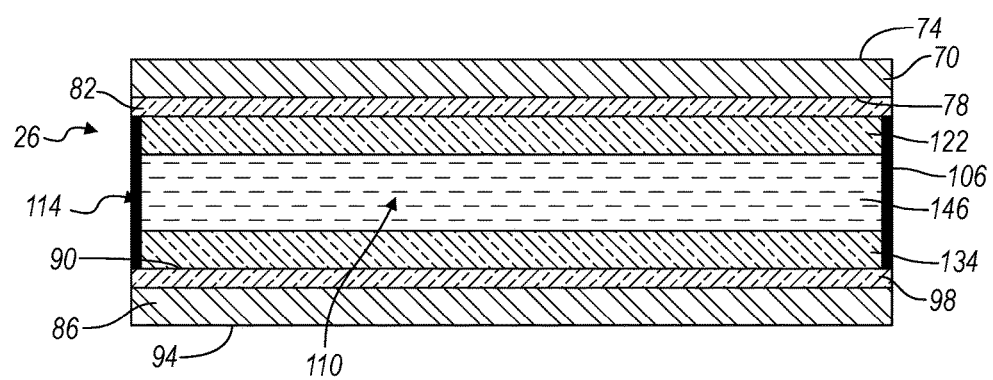
FIG. 3D is a cross-sectional view of an electro-optic element, according to another example.
Figure 3E:
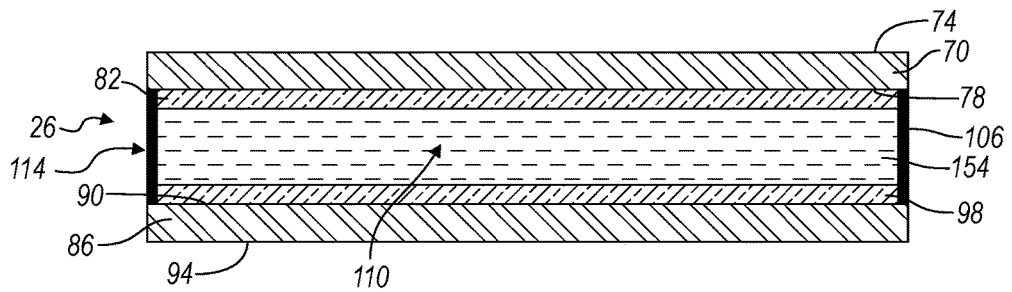
FIG. 3E is a cross-sectional view of an electro-optic element, according to another example.

Referring now to FIGS. 2-3E, disposed vehicle rearward of the reflective polarizer 22 is the electro-optic element 26. Use of the electro-optic element 26 allows the rearview mirror assembly 10 to be operable between a transparent state, which allows light of multiple polarizations (e.g., the first and/or second polarizations P1, P2) to pass through and be reflected by it, and a darkened state, in which a portion, or no light, of a certain polarization (e.g., the second polarization P2), is transmitted through the electro-optic element 26 (e.g., the electro-optic element 26 becomes essentially opaque to the second polarization P2). The electro-optic element 26 is operable between a substantially clear state and a substantially dark or darkened state, as well as intermediate states thereto. The darkened state of the electro-optic element 26 is defined relative to the transmissivity of the substantially clear state. Typical transmissivity of the electro-optic element 26 in the substantially clear state may be greater than about 25%, greater than about 50%, greater than about 55%, or greater than about 85%. The percentage of reflectance, transmittance and absorbance of the electro-optic element 26 sum to 100%. Typical transmissivity of the electro-optic element 26 in the substantially darkened state may be less than about 10% less than about 1%, less than about 0.1%, or less than about 0.01%. It will be understood that the transmissivity values in the substantially clear and darkened states is the transmissivity of the light 18 of the second polarization P2.

The electro-optic element 26 includes a first substrate 70 having the front or first surface 74 and a second surface 78. The first surface 74 is a viewer side, as indicated by an eye symbol, and is the vehicle rearward, or viewer facing side, of the rearview mirror assembly 10 (FIG. 1). In some examples, an anti-reflection layer may be disposed over part or the entirety of the first surface 74. A first electrically conductive layer 82 is positioned on the second surface 78. The electro-optic element 26 includes a second substrate 86. The second substrate 86 includes a third surface 90 and a fourth surface 94. The fourth surface 94 of the second substrate 86 is an inward, or vehicle forward, facing surface (e.g., adjacent the reflective polarizer 22). It should be noted that the first or second substrates 70, 86 may be larger than one another to create an offset along at least a portion of the perimeter of the electro-optic element 26. Further, in examples not including the optical substrate 48, the reflective polarizer 22 may be positioned on the third surface 90 or the fourth surface 94 of the electro-optic element 26 without departing from the teachings provided herein. The first and second substrates 70 and 86 can be made of glass, plastic, or other optically transparent or translucent material. The first and second substrates 70, 86 can have a thickness of less than about 1.2 mm, less than about 0.8 mm, or less than about 0.6 mm. A second electrically conductive layer 98 is positioned on the third surface 90. In various embodiments, the second electrically conductive layer 98 may include a metal reflector or one or more coatings configured as a partially reflective, partially transmissive ("transflective") coating. Further, in examples utilizing the reflective polarizer 22 on the third surface 90, the reflective polarizer 22 may be a wire-grid polarizer and function as the second electrically conductive layer 98 without departing from the teachings provided herein. Inclusion of a metal reflector or a transflective coating may render the electro-optic element 26 at least partially reflective.

Still referring to FIGS. 2-3E, a primary seal 106 traverses an approximate perimeter of, and is configured to cooperate with, the first and second substrates 70, 86 to define a cavity 110 as substantially hermetic. The primary seal 106 may be applied to the first or second substrates 70, 86 by methods commonly used in the liquid crystal display (LCD) industry, such as by silk-screening or dispensing. In one example, the primary seal 106 may incorporate a first and a second seal as components of the primary seal 106. An electro-optic structure 114 is disposed within the cavity 110. In one example, first and second annular bands of highly conductive material are optionally deposited around the perimeter of the first and second substrates 70, 86, respectively, and electrically-conducting structures (e.g., clips or wires) are secured to the highly conductive material and spatially separated from one another. The electrically-conducting structures may supply an electrical voltage to the first and second annular bands of highly conductive material to create a voltage across the electro-optic structure 114, thereby reversibly driving the electro-optic element 26 between the substantially dark and substantially clear states. The first and second annular bands of highly conductive material may include silver, gold or aluminum (such as, for example, in a form of metallic flakes or particles dispersed in a hosting material).

According to at least one embodiment, the electro-optic structure 114 is an electrochromic structure which may include at least one solvent, at least one anodic component or material, and at least one cathodic component or material. It will be understood that the anodic and cathodic components may alternatively be referred to as chromophores or electrochromic molecules. Further, it will be understood that the anodic and/or cathodic components may be a polymer or a monomer. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, as a material that exhibits a change in its extinction coefficient at one or more wavelengths upon exposure to a particular electrical potential difference. Electrochromic components, as described herein, include materials whose color or opacity are affected by an electrical current, such that when an electrical field is applied to the material, the color or opacity changes from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process For The Preparation Thereof and Use In Electrochromic Devices;" U.S. Pat. No. 6,519,072 entitled "Electrochromic Device;" and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety.

Referring now to the example depicted in FIG. 3A, the electro-optic structure 114 includes a cathodic film 122 and an anodic gel 126. In the depicted example, the cathodic film 122 is positioned, or otherwise disposed, on the first electrically conductive layer 82 and the anodic gel 126 is positioned on the second electrically conductive layer 98. It will be understood that the locations of the anodic gel 126 and the cathodic film 122 may be reversed without departing from the spirit and teachings of the disclosure. In electrochromic examples of the electro-optic structure 114, the anodic gel 126 may contain the anodic component and the cathodic film 122 may contain the cathodic component. Thus, the anodic gel 126 may be an electrochromic gel. Examples of possible electrochromic gels can be found in U.S. Pat. No. 6,268,950 entitled "Electrochromic Mirror with Two Thin Glass Elements and a Gelled Electrochromic Medium," and U.S. Pat. No. 7,001,540 entitled "Electrochromic Medium having a Self-healing Cross-linked Polymer Gel and Associated Electrochromic Device," both of which are hereby incorporated by reference in their entirety. Additionally, the anodic gel 126 may contain one or more electrolytes configured to facilitate electrical communication of the first and second electrically conductive layers 82, 98 across the anodic gel 126 and cathodic film 122. The cathodic film 122 may be a polymeric film including a plurality of polymeric chains composed of a number of repeating mer units forming a backbone of the polymer chains. In specific examples, the cathodic film 122 may include a 4,4' bipyridine and 1,4 dibromobutane tetrafluroborate copolymer, a 4,4'-bipyridine and triethylene glycol tosylate copolymer and/or 4,4'-bipyridine and tetraethylene glycol tosylate copolymer. The cathodic film 122 may include a binder polymer (e.g., polymethylmethacrylate, PMMA, polyvinyl formal, or polyethylene glycol), a plasticizer that will help facilitate ion conductivity (e.g., propylene carbonate or gamma-butyrolactone) and a supporting electrolyte (e.g., tetraethylammonium tetrafluoroborate or lithium hexafluorophosphate). In some examples, the backbone of the polymer chains may have one or more pendant groups extending therefrom. In examples of the electro-optic structure 114 including the cathodic film 122, the cathodic component may be disposed between the mer units of the backbone. In other examples, the pendant groups may additionally or alternatively include the cathodic component. In at least one example, the cathodic film 122 may be stretch oriented, or aligned, such that the polymeric chains of the cathodic film 122 are substantially aligned, as explained in greater detail below. The anodic gel 126 may be in a semi-liquid state capable of ionically transporting the anodic component to the cathodic component within the cathodic film 122. For example, the anodic gel 126 may permeate the cathodic film 122 with the one or more electrolytes and/or anodic components. In the depicted example, either or both of the cathodic and anodic components of the cathodic film 122 and anodic gel 126, respectively, may be electrochromic.

Referring now to the example depicted in FIG. 3B, the electro-optic structure 114 includes an anodic film 134 and a cathodic gel 138. In the depicted example, the anodic film 134 is positioned, or otherwise disposed, on the second electrically conductive layer 98 and the cathodic gel 138 is positioned on the first electrically conductive layer 82. It will be understood that the locations of the cathodic gel 138 and the anodic film 134 may be reversed without departing from the spirit and teachings of the disclosure. In at least one example, the anodic film 134 may be stretch oriented, or aligned, as explained in greater detail below. In electrochromic examples of the electro-optic structure 114, the cathodic gel 138 may contain the cathodic component and the anodic film 134 may contain the anodic component. Thus, the cathodic gel 138 may be an electrochromic gel. Additionally, the cathodic gel 138 may contain one or more electrolytes configured to facilitate electrical communication of the first and second electrically conductive layers 82, 98 across the cathodic gel 138 and anodic film 134. The anodic film 134 may be a polymeric film including a plurality of polymeric chains composed of a number of repeating mer units forming a backbone of the polymer chains. In some examples, the backbone of the polymer chains may have one or more pendant groups extending therefrom. In a specific example, the anodic film 134 may include 2,7-bis(2-hydroxyethyl)-5,10 hydro-5,10-bis(neopentyl)phenazine and tolylene-2,4-diisocyanate copolymer. The anodic film 134 may include a binder polymer (e.g., polymethylmethacrylate, PMMA, polyvinyl formal, or polyethylene glycol), a plasticizer that will help facilitate ion conductivity (e.g., propylene carbonate or gamma-butyrolactone) and a supporting electrolyte (e.g., tetraethylammonium tetrafluoroborate or lithium hexafluorophosphate). In examples of the of the electro-optic structure 114 including the anodic film 134, the anodic component may be disposed between the mer units of the backbone. In other examples, the pendant groups may additionally or alternatively include the anodic component. In at least one example, the anodic film 134 may be stretch oriented, or aligned, such that the polymeric chains of the anodic film 134 are substantially aligned, as explained in greater detail below. The cathodic gel 138 may be in a semi-liquid state capable of ionically transporting the cathodic component to the anodic component within the anodic film 134. For example, the cathodic gel 138 may permeate the anodic film 134 with the one or more electrolytes and/or cathodic components. In the depicted example, either or both of the anodic and cathodic components of the anodic film 134 and cathodic gel 138, respectively, may be electrochromic.

Referring now to the example depicted in FIG. 3C, the electro-optic structure 114 includes both the cathodic film 122 and the anodic film 134. The cathodic film 122 and the anodic film 134 may be in direct contact with one another, or may be separated (e.g., by a film which is configured to promote electrical or ion exchange). As explained above, the cathodic and anodic films 122, 134 may be polymeric films including the cathodic component and anodic component disposed along the backbone, or on pendants, of the polymeric chains of the cathodic and anodic films 122, 134, respectively. Further, the cathodic and anodic films 122, 134 may be stretch oriented, or aligned, such that the polymeric chains of the cathodic and anodic films 122, 134 are substantially aligned. In such examples, the polymeric chains of the cathodic and anodic films 122, 134 may be substantially aligned with respect to one another. The cathodic and/or anodic components may be electrochromic in such an example.

Referring now to the example depicted in FIG. 3D, the electro-optic structure 114 includes both the cathodic film 122 and the anodic film 134 in addition to an electrolyte layer 146. The electrolyte layer 146 may be a gel (e.g., a semi-liquid configured to permeate the cathodic and anodic films 122, 134) or polymeric electrolyte. In examples utilizing a polymeric electrolyte as the electrolyte layer 146, the polymeric electrolyte may include Poly(styrene-ran-ethylene), Polystyrene-block-poly(ethylene-ran-butylene), Poly(styrene-ran-ethylene), Polystyrene-block-poly(ethylene/butylene)-block-polystyrene, Poly(ethylene glycol), Poly(methyl methacrylate), other polymer electrolytes and/or combinations thereof. As explained above, the polymeric chains of the cathodic and anodic films 122, 134 may be substantially aligned with one another. The electrolyte layer 146 may partially permeate the cathodic and anodic films 122, 134.

Referring now to the example depicted in FIG. 3E, the electro-optic structure 114 may include an electro-optic film 154. The electro-optic film 154 may be a polymeric material composed of a plurality of polymeric chains, similar to the cathodic and anodic films 122, 134 (FIGS. 3C and 3D). In such an example, the electro-optic film 154 may contain both the anodic component and the cathodic component on the backbones of the polymeric chains, and/or as pendant groups. In some examples, the anodic component and cathodic component may both be positioned on the same polymer chains, while in other examples, the anodic component and cathodic component may be positioned on separate polymeric chains. Similarly to the cathodic and anodic films 122, 134, the polymeric chains of the electro-optic film 154 may be substantially aligned.

Figure 4:
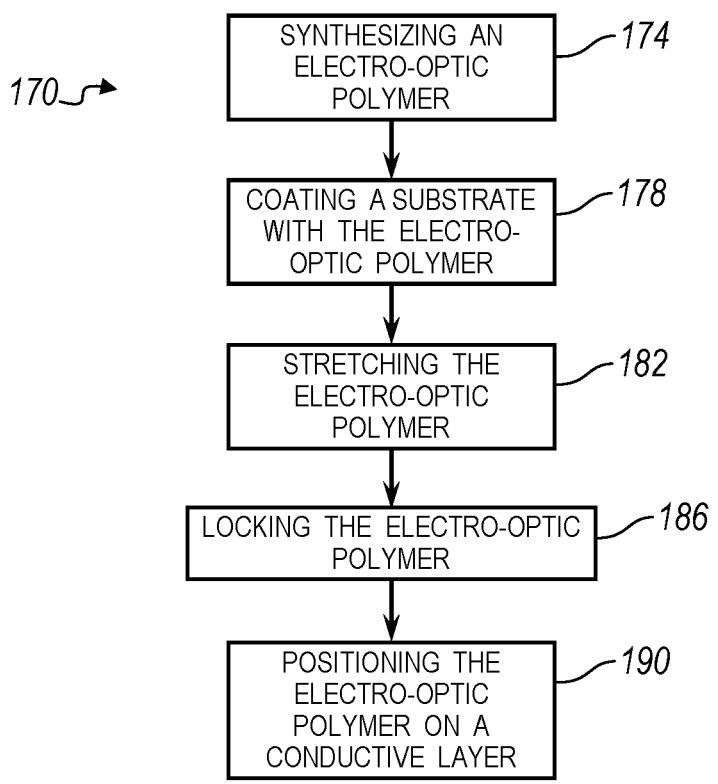
FIG. 4 depicts a method of forming an electro-optic element, according to one example.

Referring now to FIG. 4, depicted is an exemplary method 170 having steps 174, 178, 182, 186, and 190 for forming the electro-optic structure 114. In step 174, synthesizing an electro-optic polymer is performed (e.g., the polymers of the cathodic, anodic, or electro-optic films 122, 134, 154). Step 174 may be performed by combining the mer units of the electro-optic polymer with at least one of the cathodic component and anodic component. The mer units, cathodic component and/or anodic component are then polymerized to form chains of polymer (e.g., with or without pendant groups). Next, step 178 of coating a substrate with the electro-optic polymer is performed. The substrate may be glass, ceramic, metal, polymer or any other material configured to not react (e.g., bond or alter) with the electro-optic polymer. The coating of the substrate may be accomplished using spin coating, slot or die coating, slide coating, inkjet coating, curtain coating or by various other coating methods. One or more solvents may be present in the electro-optic polymer to aid in coating of the substrate.

Next, step 182 of stretching the electro-optic polymer is performed. The electro-optic polymer may be stretched, or drawn, from between about 1.5 times to 10 times its initial length. In specific examples, the electro-optic polymer may be stretched 2, 3, 4, 5, 6, 7, 8, 9 or 10 times its initial length. The electro-optic polymer may be stretched mechanically (e.g., physically pulling, spin coating, drawing, etc.) or electrically. In some examples, heat may be applied during the stretching or drawing of the electro-optic polymer. Formation and polymerization of the electro-optic polymer typically results in a random, tangled and disordered state of the polymeric chains of the electro-optic polymer. Stretching of the electro-optic polymer creates an anisotropic, or aligned, formation of the chains of the polymer. Stretching of the polymer may align greater than 10%, 20%, 30%, 40%, 50%, 60%, 70%, 80% or greater than 90% of the polymer chains of the electro-optic polymer.

Next, step 186 of locking the electro-optic polymer is performed. Locking of the electro-optic polymer ensures that once the mechanical or electrical force stretching and aligning the chains of the electro-optic polymer is removed, the chains do not revert to the disordered and unaligned state. Locking of the electro-optic polymer in the aligned state may be accomplished by cross linking the chains of the electro-optic polymer, cooling the polymer to below its glass transition state (e.g., if the polymer was heated during the stretching or drawing step 182) or by other methods known in the art. Finally, step 190 of positioning the aligned electro-optic polymer on a conductive layer (e.g., at least one of the first and second electrically conductive layers 82, 98) is performed to form at least one of the cathodic, anodic and electro-optic films 122, 134, 154. The electro-optic polymer may be bonded, adhered to or otherwise coupled to the at least one of the first and second electrically conductive layers 82, 98. In a specific example, the electro-optic polymer may be laminated to at least one of the first and second electrically conductive layers 82, 98. The electro-optic polymer is in directed contact with at least one of the first and second electrically conductive layers 82, 98. In examples utilizing two layers of electro-optic polymer, the layers may be aligned parallel to one another, however, it will be understood that in examples where only one electro-optic polymer exhibits an extinction coefficient within a visible waveband of light, the two layers need not be parallel to one another.

Referring now to FIGS. 5A and 5B, use of the present disclosure may allow for the selective reduction of a certain polarization of light. For example, by positioning the cathodic and/or anodic components (at least one of which is electrochromic) on the backbone of the polymer chains, stretch aligning of the electro-optic polymer may result in the absorption of only one polarization of light (e.g., the first or second Polarizations P1, P2). For example, the stretched cathodic and/or anodic films 122, 134 may be aligned such that in the clear state (FIG. 5A) light of both the first and second polarizations P1, P2 may pass through the electro-optic element 26, while in the darkened state (FIG. 5B) light of only one polarization (e.g., the first polarization P1) may pass. As such, the electro-optic element 26 may be used to allow the rearview mirror assembly 10 to reversibly change between a conventional mirror and an electronic display. For example, when the electro-optic element 26 is in the clear state, light from around the rearview mirror assembly 10, having both the first and second polarizations P1, P2, may pass through the electro-optic element 26 and be reflected by the reflective polarizer 22. The reflected second polarization P2 originating external to the rearview mirror assembly 10 typically has a higher luminance than the light 18 having the first polarization P1 emitted from the display 14. As such, when the electro-optic element 26 is in the clear state and does not absorb the second polarization P2, the second polarization P2 washes out the first polarization P1 and a viewer of the assembly 10 perceives a reflected image. However, when the electro-optic element 26 is in the darkened state and absorbs the second polarization P2, the relative contrast of the first polarization P1 is greater and the viewer is able to perceive an image formed by the display 14. With the use of such rearview mirror assemblies 10, the contrast of the illumination from the display 14, as perceived by the driver through reflective polarizer 22 and/or electro-optic element 26 against a background of ambient light reflected by the reflective polarizer 22, remains quite low, particularly when the ambient light is plentiful such as on a bright sunny day. The contrast may be defined as the ratio of the intensity of light generated by the display 14 reaching the viewer and the intensity of ambient light reflected by the reflective polarizer 22.

Use of the forgoing disclosure may offer several advantages. First, use of the display 14, reflective polarizer 22 and stretch aligned examples of the electro-optic element 26 allow for the production of a rearview mirror assembly 10 which may function as a conventional mirror (e.g., due to the reflection by the reflective polarizer 22) and an electronic display capable of showing a plurality of camera and computer generated images. Second, use of the stretch aligned cathodic film 122, anodic film 134 and/or electro-optic film 154 may allow for the selective reduction of light emanating from the rearview mirror assembly 10. For example, light of the first polarization P1, emitted by the light source 44 and/or display 14 is allowed to pass through the reflective polarizer 22 and the electro-optic element 26 without being impeded, while light of the second polarization P2 (e.g., from ambient sources external to the rearview mirror assembly 10) may be absorbed by the electro-optic element 26 when in the darkened state. Selective reduction of the second polarization P2 may be advantageous in increasing a contrast of the display 14 to a viewer (i.e., because an image formed by the display 14 will not appear washed out by higher luminance ambient light of the second polarization P2). Third, use of the electro-optic element 26, as disclosed herein, allows for the rearview mirror assembly 10 to transition between electronic display and conventional mirror without the use of mechanical means such as a flipper or the use of an optical biasing prism which may impart a luxury or elegant feel to the rearview mirror assembly 10.

Fourth, use of the multiple electro-optic polymers and/or gels may allow, in the event of rearview mirror assembly 10 failure, the electro-optic element 26 to preferentially fail in a clear state such that the rearview mirror assembly 10 may still be utilized as a conventional mirror. For example, a ferrocene compound (e.g., or other compound which exhibits a low extinction coefficient in visible wavelengths) may be used in a bi-stable arrangement as the anodic or cathodic component. In such an example, the electro-optic element 26 may be configured to fail such that the ferrocene compound is activated and the rearview mirror assembly 10 may be used as a conventional mirror.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicular rearview assembly, comprising:
a display configured to emit light of a first polarization;
a reflective polarizer positioned adjacent the display, the reflective polarizer configured to transmit the light of the first polarization and reflect light of a second polarization; and
an electro-optic element positioned in front of the display and on an opposite side of the reflective polarizer than the display, the electro-optic element configured to transition between substantially clear and substantially darkened states, wherein the electro-optic element comprises a plurality of electrochromic molecules disposed on polymeric chains that are substantially anisotropically aligned with the light of the second polarization such that the electro-optic element is configured to substantially absorb the light of the second polarization and substantially transmit the light of the first polarization when in the darkened state, and
wherein the electrochromic molecules exhibit a change in extinction coefficient at one or more wavelengths upon exposure to an electrical potential difference.

2. The vehicular rearview assembly of claim 1, further comprising:
a light source, wherein the light source is positioned on an opposite side of the display than the reflective polarizer.

3. The vehicular rearview assembly of claim 1, wherein the display is a liquid crystal display.

4. The vehicular rearview assembly of claim 1, wherein the electro-optic element is configured to be substantially free of light absorption of the first polarization.

5. A vehicular rearview assembly, comprising:
a display configured to emit light of a first polarization;
a reflective polarizer positioned adjacent the display, the reflective polarizer configured to transmit the light of a first polarization and reflect light of a second polarization; and
an electro-optic element positioned in front of the display and on an opposite side of the reflective polarizer than the display and configured to transition between substantially clear and substantially darkened states, comprising:
a first substantially transparent substrate defining first and second surfaces, wherein the second surface comprises a first electrically conductive layer;
a second substantially transparent substrate defining third and fourth surfaces, wherein the third surface comprises a second electrically conductive layer;
a primary seal disposed between the first and second substrates, wherein the primary seal and the first and second substrates define a cavity there between; and
a polymeric film disposed within the cavity and comprising polymeric chains including a plurality of electrochromics, wherein the polymeric chains are substantially anisotropically aligned with the light of the second polarization such that the electro-optic element is configured to substantially absorb the light of the second polarization and substantially transmit the light of the first polarization when in the darkened state, and wherein the electrochromics exhibit a change in extinction coefficient at one or more wavelengths upon exposure to an electrical potential difference.

6. The vehicular rearview assembly of claim 5, wherein the electrochromics of the polymeric film comprise a cathodic component.

7. The vehicular rearview assembly of claim 6, further comprising:
an anodic gel positioned in contact with the polymeric film and the second electrically conductive layer.

8. The vehicular rearview assembly of claim 5, wherein the electrochromics of the polymeric film comprise an anodic component.

9. The vehicular rearview assembly of claim 8, further comprising:
a cathodic gel positioned in contact with the polymeric film and the first electrically conductive layer.

10. The vehicular rearview assembly of claim 5, wherein the polymeric film comprises cathodic and anodic components.

11. The vehicular rearview assembly of claim 5, wherein the electro-optic element is configured to be substantially free of light absorption of the first polarization.

12. The vehicular rearview assembly of claim 5, wherein the polymeric film is cross linked.

13. The vehicular rearview assembly of claim 12, wherein the polymeric film is cross linked with the polymeric chains substantially anisotropically aligned with the light of the second polarization.

14. A vehicular rearview assembly, comprising:
a display configured to transmit light of a first polarization;
a reflective polarizer positioned adjacent the display, the reflective polarizer configured to transmit the light of the first polarization and reflect light of a second polarization; and
an electro-optic element positioned in front of the display and on an opposite side of the reflective polarizer than the display and configured to transition between substantially clear and substantially darkened states, comprising:
a first substantially transparent substrate defining first and second surfaces, wherein the second surface comprises a first electrically conductive layer;
a second substantially transparent substrate defining third and fourth surfaces, wherein the third surface comprises a second electrically conductive layer;
a primary seal disposed between the first and second substrates, wherein the primary seal and the first and second substrates define a cavity there between;
a first polymeric film positioned within the cavity, the first polymeric film comprising polymeric chains including a plurality of cathodic electrochromics aligned with the light of the second polarization; and
a second polymeric film in the cavity, the second polymeric film comprising polymeric chains including a plurality of anodic electrochromics aligned with the light of the second polarization,
wherein the polymeric chains of the first polymeric film and the polymeric chains of the second polymeric film are substantially anisotropically aligned with the light of the second polarization such that the electro-optic element is configured to substantially absorb the light of the second polarization and substantially transmit the light of the first polarization when in the darkened state, and
wherein the cathodic and the anodic electrochromics exhibit a change in extinction coefficient at one or more wavelengths upon exposure to an electrical potential difference.

15. The vehicular rearview assembly of claim 14, further comprising:
an electrolyte layer positioned between the first and second polymeric films.

16. The vehicular rearview assembly of claim 14, wherein the first and second polymeric films are cross linked.

17. The vehicular rearview assembly of claim 14, wherein the reflective polarizer comprises at least one of a wire-grid and a polymer.

18. The vehicular rearview assembly of claim 14, wherein the display is a liquid crystal display.

19. The vehicular rearview assembly of claim 14, wherein the electro-optic element is configured to not substantially absorb light of the first polarization.

20. The vehicular rearview assembly of claim 14, further comprising:
a light source, wherein the light source is positioned on an opposite side of the display than the reflective polarizer.

* * * * *